United States Patent [19]

Winski

[11] Patent Number: 5,447,221

[45] Date of Patent: Sep. 5, 1995

[54] MATERIAL HANDLING EQUIPMENT WITH BRUSH SWEEP

[75] Inventor: Ernest P. Winski, Oshkosh, Wis.

[73] Assignee: Kinetic Robotics, Inc., Menasha, Wis.

[21] Appl. No.: 141,788

[22] Filed: Oct. 25, 1993

Related U.S. Application Data

[63] Continuation-in-part of Ser. No. 449,235, Dec. 6, 1989, Pat. No. 5,256,028, which is a continuation of Ser. No. 102,386, Sep. 29, 1987, abandoned, which is a continuation-in-part of Ser. No. 888,511, Jul. 23, 1986, abandoned.

[51] Int. Cl.$^6$ .............................................. B65G 47/52
[52] U.S. Cl. .................................. 198/468.11; 198/749
[58] Field of Search ............... 198/463.2, 468.11, 719, 198/727, 734, 749

[56] References Cited

U.S. PATENT DOCUMENTS 3,071,240 1/1963 Graham et al. .................. 198/734 X
3,295,666 1/1967 Kay et al. ......................... 198/734 X
4,250,988 2/1981 Miaskoff ............................. 198/719

*Primary Examiner*—Michael S. Huppert
*Assistant Examiner*—Janice L. Krizek
*Attorney, Agent, or Firm*—Thomas D. Wilhelm

[57] ABSTRACT

Material handling equipment includes an in-feed conveyor having a sweep arm for traversing across the in-feed conveyor to thus sweep off the conveyor units of material disposed thereon. The sweep arm includes a brush, having bristles extending downwardly into spaces between the carrying elements of the conveyor, whereby thin-section materials on the conveyor are engaged by the bristles and swept off the conveyor. The sweep arm can optionally also sweep the materials onto and across the in-feed station of a palletizer positioned adjacent the in-feed conveyor. The in-feed station can have channels in its upper surface, extending in the direction of sweep of the sweep arm. For reaching into the spaces on the in-feed conveyor, and into channels on the in-feed station of the palletizer, no indexing is required between the spaces on the conveyor and the channels on the in-feed station; nor is any indexing required between the push arm and either the spaces on the in-feed conveyor or the channels on the in-feed station of the palletizer.

22 Claims, 6 Drawing Sheets

MATERIAL HANDLING EQUIPMENT WITH BRUSH SWEEP

This is a continuation in part of application Ser. No. 07/449,235 filed Dec. 6, 1989, now Pat. No. 5,256,028 which is a continuation of application Serial No. 07/102,386 filed Sep. 29, 1987, abandoned, which is a continuation in part of application Ser. No. 06/888,511 filed Jul. 23, 1986, abandoned, all the above being herein incorporated by reference in their entireties.

FIELD OF THE INVENTION

This invention relates to handling material on pallets. It relates to palletizing materials with a minimum amount of manual lifting on the part of attending labor or machine operators. The invention relates specifically to palletizing thin-section materials, and especially loose stacks of printed materials such as newspapers, signatures, sheets of paper, magazines and the like; including stacks of in-process material. Individual elements of the material being palletized can be as thin as a single sheet of paper or as thick as a magazine or a book.

BACKGROUND OF THE INVENTION

Apparatus for palletizing bundles of newspaper is known in the art. A conventional palletizer for boxes or cartons may use a horizontally, reciprocally movable stripper plate for carrying boxes to a position above a pallet onto which the boxes are to be loaded. The stripper plate is then withdrawn from beneath the boxes, thereby depositing them onto the pallet. A retainer is used for preventing the boxes from moving with the stripper plate as it is withdrawn. Such retainers commonly include a bar which abuts the side of the boxes facing the direction of stripper plate withdrawal. Structures of this general nature are disclosed in, for example, U.S. Pat. No. 3,149,732 Gagnon et al and U.S. Pat. No. 3,833,132 Alduk.

U.S. Pat. No. 4,704,060 discloses a palletizer for palletizing stacks of loose materials such as newspapers, signatures, sheets of paper, and the like. The '060 patent discloses a transfer plate assembly and plate mover, for depositing material onto a pallet or onto a partial load of material on a pallet. In that teaching, underlying compressible materials can be compressed by the transfer plate assembly during the process of depositing the material. Both the material being deposited and the underlying material can be prevented from moving with the transfer plate assembly, by first and second sets of fingers projecting into channels in the top and bottom surfaces of the transfer plate assembly. The pallet load which results from loading a pallet as disclosed therein consists of a plurality of stacks of loose material extending from the underlying pallet, or a slip sheet thereon, to the upper extremity of the stack, typically the top of the pallet load.

Within that environment of continuous stacks, unloading the material from the pallet is typically done by manual labor. In that process, the material is removed in a series of steps limited by the amount of material a person can manually lift at one time.

Alternatively, unloading might be done by a depalletizer wherein essentially an entire layer of the material is pushed, or swept, off the pallet at one time. The latter case of using a depalletizer is preferred in that it reduces the chance of back injury caused by excessive manual labor at the point of depalletizing, along with the associated savings in labor costs.

One problem with moving loose stacks of materials automatically is that each unit of material on the pallet must be acted upon in some way, by the apparatus, to affect the desired movement.

A unit of material is herein defined as any article, or group of articles, of the load, requiring a separate external force to cause it to move. Thus a single loose sheet of paper is a unit as is a bound bundle of papers. For assembled documents, such as newspaper, each document is generally a unit of material.

With the small thickness of, for example, paper, it is easy for sheets, near the bottom of a stack, to be missed by typical material handling apparatus which functions by action on a side of the stack or unit of material as a whole, at the edges of the sheets. Yet, efficient material handling of thin sheets typically is done through interactions at the sheet edges.

Another problem with automatically moving stacks of thin-section materials is moving the stacks or units of materials from an in-feed conveyor or the like, into the palletizing apparatus. U.S. Pat. Nos. 4,704,060 and 4,988,264 address methods of moving thin-section material, wherein the thin-section material is positioned on a transfer plate assembly, or on a spacing sheet on a pallet. In both such cases, the transfer plate assembly or spacing sheet can be precisely positioned, such that channels in the upper surface of the transfer plate assembly or sheet are correspondingly precisely positioned. Further, in those teachings, the channels extended at a uniform depth along the entire path of movement of the units/stacks of material. Thus, it was expedient there to mount a push arm above the transfer plate assembly or sheet such that fingers on the push arm were precisely aligned and thus extended into, but did not touch the walls of, the channels. Accordingly, the fingers could reach below the top surface of the transfer plate assembly or sheet and sweep off even thin-section sheets and the like at the plate/sheet surface.

In addition to the above mentioned patents, palletizing apparatus is disclosed in the following United States patents, the following patents also being disclosed in U.S. Pat. No. 4,704,060.

| | |
|---|---|
| Locke et al. | 2,875,907 |
| Woodcock | 2,875,908 |
| Keyes | 2,878,948 |
| Gagnon | 3,149,732 |
| Jeremiah | 3,166,203 |
| Kampert | 3,257,006 |
| Grasvoll | 3,594,977 |
| Larson | 3,606,310 |
| Brockmuller et al. | 3,637,093 |
| Grasvoll | 3,648,857 |
| Carlson | 3,669,282 |
| Alduk | 3,833,132 |
| Golantsev | 3,837,140 |
| Kelley | 4,030,618 |
| Schmitt | 4,162,016 |
| Schmitt | 4,195,959 |
| Pantin et al. | 4,205,934 |
| Faltin | 4,230,311 |
| Donnelly | 4,234,280 |
| Meratti et al. | 4,255,074 |
| Cox et al. | 4,342,531 |
| Sylvander | 4,383,788 |
| Werkheiser | 4,422,549 |
| Werkheiser | 4,439,084 |
| Wise | 4,477,067 |

In this teaching, we address pushing the same types of materials from the in-feed conveyor or the like, onto the in-feed station of the palletizer. The in-feed station of the palletizer has a receiving plate for receiving units of material from the in-feed conveyor. The receiving plate can be a transfer plate assembly that ultimately moves, with the material on it, to another station in the palletizing operation; or it can be a stationary plate that receives and holds the units of material while a layer is being formed thereon, and then gives up the formed layer to the transfer plate assembly.

As the push arm pushes thin section material off the in-feed conveyor, and onto the receiving plate, it must reach below the tops of the carrying elements which carry the units of material on the conveyor, in order to assuredly remove all the material from the conveyor.

Pushing thin-section material across the in-feed conveyor presents two new constraints. First, as the push arm sweeps transversely across the in-feed conveyor, it passes over the conveyor carrying elements while reaching below the tops of the carrying elements, and into the intervening spaces. The spaces between the carrying elements of the conveyor present a first depth into which the push arm must reach. The channels in the receiving plate present a second, typically different, depth into which the push arm must reach. These two depths typically are different, and present the problem of how to assuredly sweep the material from both depths on a single sweep of the push arm.

Second, the "fingers" of the push arm must reach into both the spaces between the carrying elements in the conveyor (a type of channel, and referred to hereinafter interchangeably as both channels and spaces), and into any channels in the receiving plate. This suggests aligning the "fingers" of the push arm with both the channels in the conveyor and the channels, if any, in the receiving plate.

The first constraint suggests limits on the depth to which the fingers can reach into the channels, typically controlled by the height of the top of the conveyor frame. The second constraint suggests aligning the spaces (or channels) between the carrying elements of the in-feed conveyor with the channels in the receiving plate, so that a single set of fingers on the push arm can be aligned with the "channels" in the conveyor, and also aligned with channels in the receiving plate. In such an arrangement, each channel is assigned to receive a particular finger, and each finger is assigned to a particular channel, before the material handling operation begins; whereby the coordination of specific finger/channel pairs is pre-arranged, and generally remains constant throughout the use life of the material handling apparatus.

While the above-suggested alignment may be possible, it adds undesirable complexity to the control of the in-feed system.

It is an object of this invention to provide a push arm which obviates the two above constraints, without adding the suggested undesirable complexity of control.

Thus, it is an object to provide material handling apparatus wherein the depth to which the fingers can reach is not limited by the conveyor frame, or by the receiving plate.

It is a further object to provide material handling apparatus wherein channels on the in-feed conveyor need not be aligned with channels on the receiving plate.

It is yet another object to provide material handling apparatus wherein brush bristles (replacing the conventional fingers) extend into channels on the conveyor to a depth below the top surface of the receiving plate, and effectively sweep the units of material onto and across the receiving plate without any necessity to align the channels in the conveyor with channels in the receiving plate while the material handling apparatus is in operation.

SUMMARY OF THE DISCLOSURE

Some of the objects are attained in a material handling system comprising a palletizer, the palletizer having an in-feed station for receiving units of material into the palletizer; transfer apparatus for transferring units of material from the in-feed station; and a push arm for pushing units of material onto the in-feed station by moving in a first direction toward and over the in-feed station, the push arm including a support member extending transverse to the direction of movement of the push arm, the push arm further including a brush including a set of resiliently deflectable bristles extending from the support member such that the bristles impinge on, and are deflected by, the in-feed station when the support member is disposed over the in-feed station.

Preferably, the bristles are sufficiently stiff, and in sufficient number, that the bristles can, in combination, push onto the in-feed station a unit of material weighing up to at least 1 ounce, preferably at least 2 ounces, more preferably at least 8 ounces, most preferably at least 1 pound, per inch of dimension of the unit of material extending along the support member.

In some embodiments, the in-feed station comprises a stationary plate, for forming a layer thereon. In other embodiments, the in-feed station comprises a transfer plate for forming a layer thereon and transferring the layer out of the in-feed station.

The palletizer preferably operates in cooperation with an in-feed conveyor disposed adjacent the in-feed station of the palletizer such that units of material can be pushed from the in-feed conveyor directly onto the in-feed station of the palletizer. The in-feed conveyor includes (i) a frame, (ii) a material carrier supported on the frame, the material carrier having carrying elements for carrying units of material. The carrying elements are preferably arranged one behind the other, with spaces therebetween, extending transversely across the conveyor. The push arm is mounted and positioned to traverse across the in-feed conveyor and thereby to push units of material off the in-feed conveyor and onto the in-feed station, wherein, as the push arm traverses across the in-feed conveyor, a first subset of the bristles impinges on and is deflected by the carrying elements, and a second subset of the bristles extends into the spaces.

Preferably, the in-feed conveyor has a discharge locus, and comprises a drive apparatus for driving the carrying elements and thereby moving the carrying elements toward the discharge locus.

The invention also comprehends a method of removing units of material from a conveyor wherein the conveyor has a length, a width transverse to the length, and opposing sides, and comprises a frame; a material carrier supported on the frame and having carrying elements arranged one behind the other, the tops of the carrying elements, in combination, defining an imaginary plane in which units of material are supported on the conveyor. The method comprises the steps of positioning a push arm, comprising a support member, along the length of, and at one side of, the conveyor, the push arm further comprising a brush, including a set of resiliently deflectable bristles extending from the support member such that at least some of the bristles extend below the imaginary plane; traversing the push arm in a path across the width of the conveyor to thereby push off any unit of material on the conveyor in the path traversed by the push arm; whereby in traversing across the conveyor, at least some of the bristles on the push arm extend below the imaginary plane and into the spaces to sweep off the conveyor any thin-section material disposed proximate the imaginary plane.

In preferred methods, the conveyor has a discharge locus, and the push arm is positioned over the conveyor at the discharge locus, and including, prior to the traversing of the push arm across the width of the conveyor, the steps of advancing the carrying elements along the length of the conveyor and toward the discharge locus, to thereby advance units of material toward the discharge locus; and stopping the advance of the carrying elements such that the carrying elements are positioned randomly along the length of the conveyor, and randomly with respect to the bristles on the push arm.

The preferred method further comprises the steps of advancing the carrying elements, and the corresponding spaces a first time along the length of the conveyor; stopping the advance of the carrying elements and the corresponding spaces a first time, such that the spaces are positioned at a first set of loci along the length of the conveyor; traversing the push arm across the width of the conveyor, with a first subset of the bristles extending into the first set of spaces and a second subset of the bristles impinging on and being deflected by the carrying elements between the spaces having bristles therein; advancing the carrying elements and the corresponding spaces a second time along the length of the conveyor; stopping the advance of the carrying elements and the corresponding spaces a second time, such that the spaces are positioned at a second different set of loci along the length of the conveyor; and traversing the push arm across the width of the conveyor, with a third subset of the bristles, different from, but not necessarily exclusive of, the first subset, extending into the second set of spaces and a fourth subset of the bristles, different from, but not necessarily exclusive of, the second subset, being deflected by carrying elements between the spaces having bristles therein. The method preferably includes performing the steps in this paragraph in the order stated.

DETAILED DESCRIPTION OF THE ILLUSTRATED EMBODIMENTS

Figure 1:
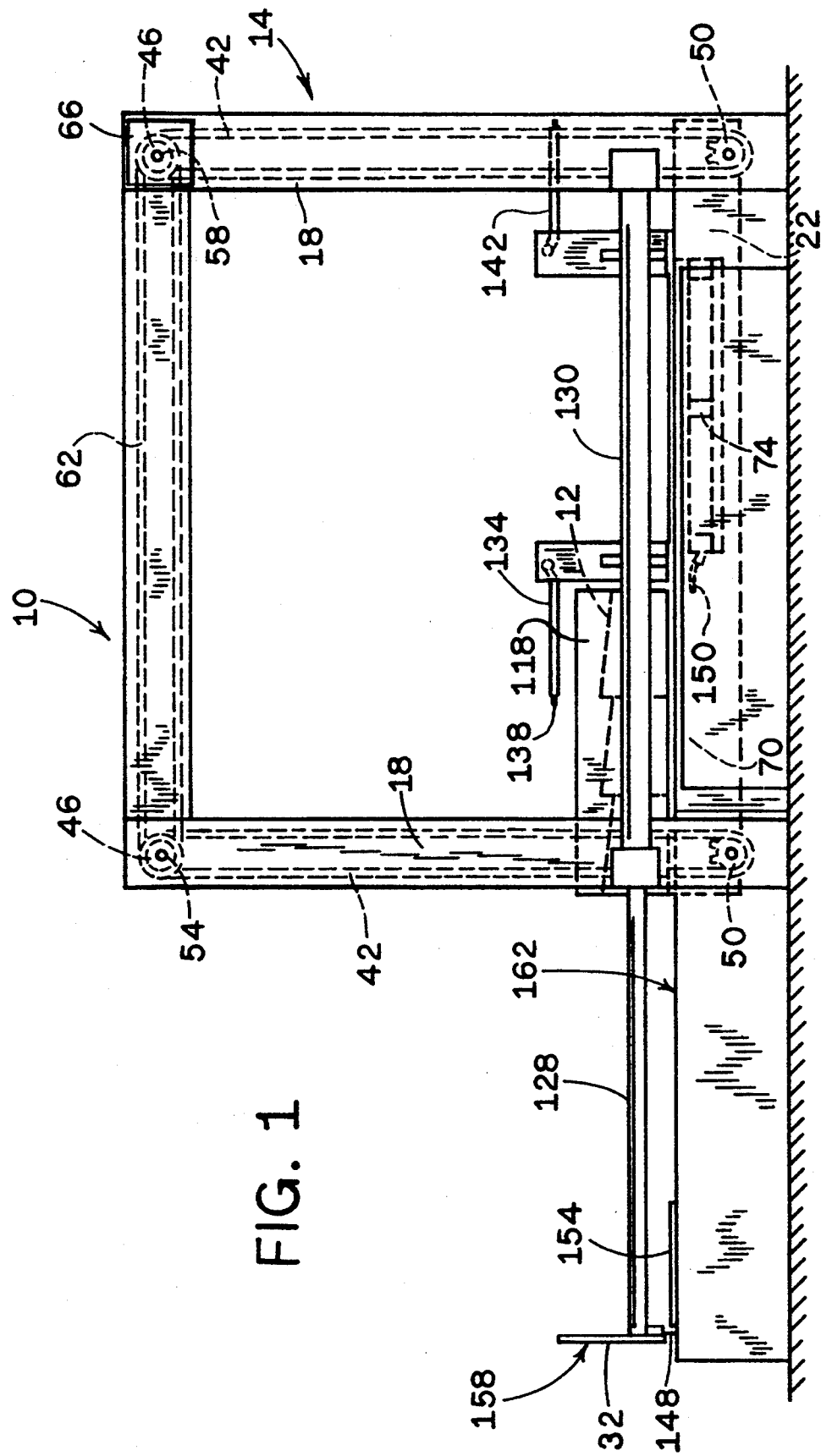
FIG. 1 is an elevation view of a material handling system of this invention.

A palletizer 10 embodying the invention is illustrated in the drawings. The palletizer 10 is usable for depositing a layer of material, such as stacks 12 of loose newspapers on a supporting surface, namely any surface capable of supporting the weight of the load, such as a pallet, a spacing sheet, or a previously deposited stack of material.

Figure 2:
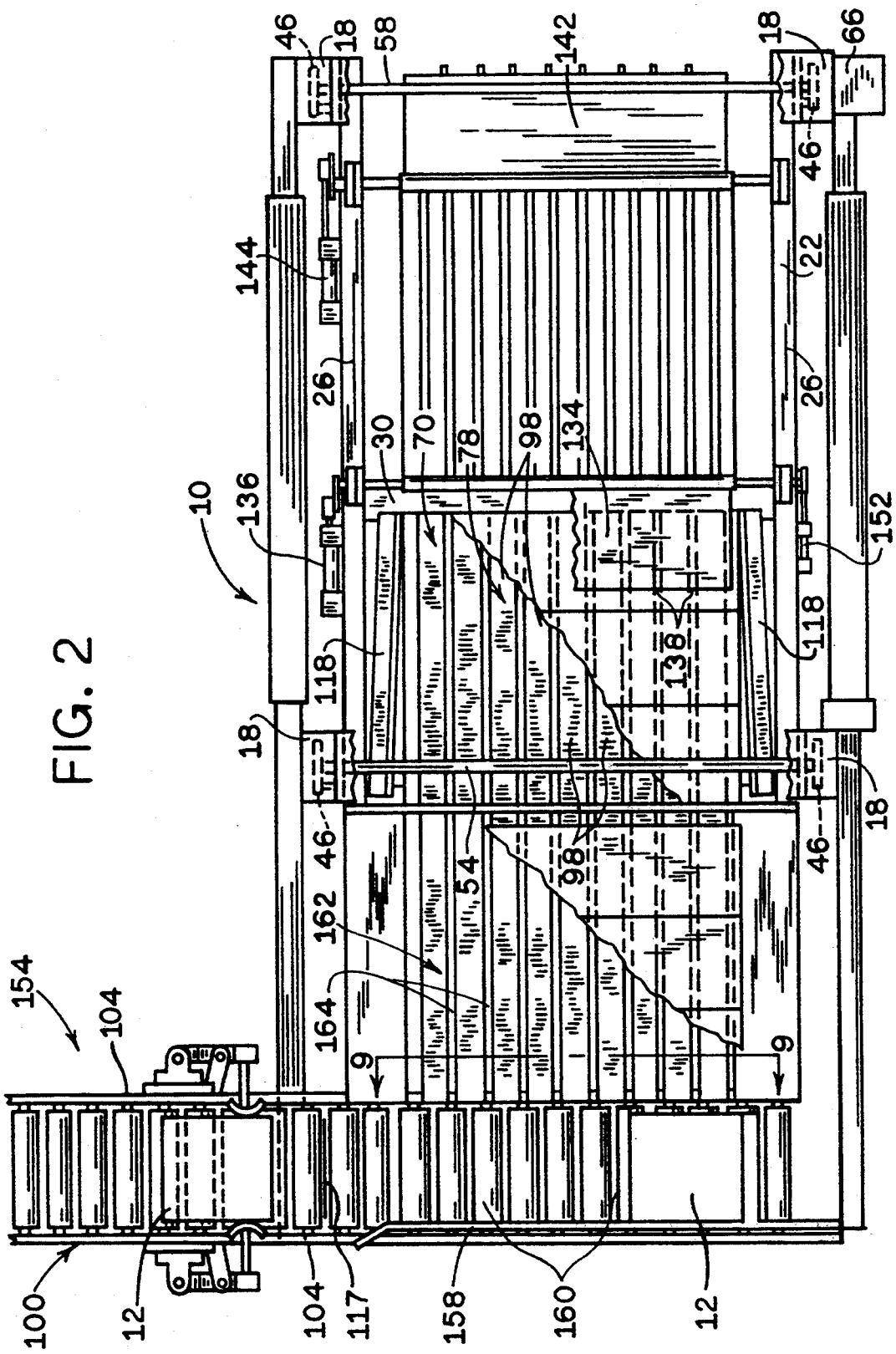
FIG. 2 is a top view of the material handling system of this invention.
Figure 4:
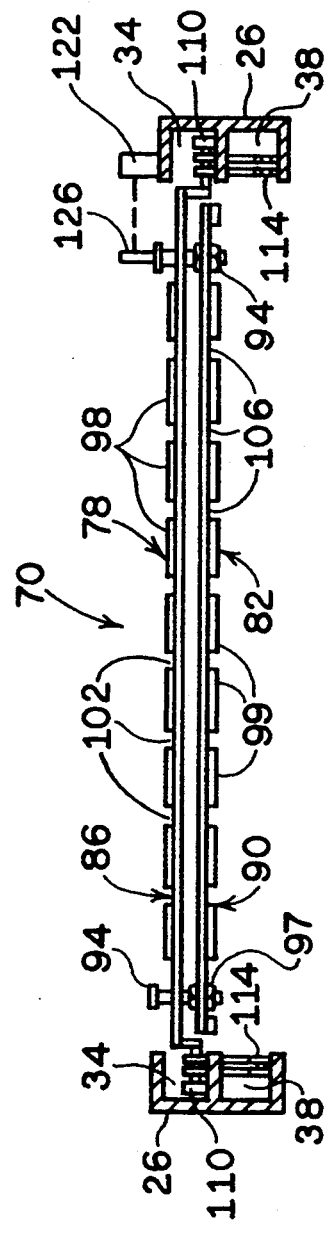
FIG. 4 is a cross sectional view, taken along line 4—4 in FIG. 3.

As best shown in FIGS. 1 and 2, the palletizer 10 comprises a frame 14 including four generally vertical members or posts 18 defining the corners of a rectangle. The palletizer 10 also comprises a generally rectangular, horizontally disposed carriage 22 having opposite first and second or right and left ends and four corners respectively connected to the four posts 18 of the frame 14 for vertical movement of the carriage relative to the posts 18. In the illustrated construction, the carriage 22 includes first and second generally parallel, horizontal, spaced apart side members 26, connected by a central connecting member 30. As best shown in FIG. 4, each of the side members 26 has an E-shaped cross-section and defines upper and lower channels 34 and 38 opening inwardly and having opposed upper and lower generally horizontal surfaces.

The palletizer 10 also comprises drive apparatus for reciprocally, vertically moving the carriage 22 relative to the frame 14. In the preferred embodiment, the drive apparatus for vertically moving the carriage 22 includes apparatus on each of the posts 18 for causing relative movement of the respective corner of the carriage 22. Preferably, the apparatus on each of the posts 18 includes an endless chain 42 connected to the respective corner of the carriage 22. As best shown in FIG. 1, each post 18 includes an upper drive sprocket 46 and a lower idler sprocket 50. Endless chain 42 is mounted around the sprockets 46 and 50. The upper sprockets 46 of the two left posts 18 (as viewed in FIG. 1) are connected by a horizontal drive shaft 54 and the upper sprockets 46 of the two right posts 18 (as viewed in FIG. 1) are connected by a horizontal drive shaft 58. The upper sprockets 46 of the two lower posts 18 (as viewed in FIG. 2) are connected by an endless drive chain 62. Drive chain 62 is shown in FIG. 1. Drive motor 66 is connected to the drive shaft 58 to drive the two right chains 42, and via the endless chain 62 and the drive shaft 54, the two left chains 42. Accordingly, the four endless chains 42 move in common, thereby causing common vertical movement of the four corners of the carriage 22.

The palletizer 10 also comprises a generally horizontal transfer plate assembly 70 mounted on the carriage 22 for reciprocal horizontal movement relative to the carriage 22 between a first or right position (FIG. 6) wherein the transfer plate assembly 70 is adjacent the first or right end of the carriage 22 and a second or left position (FIGS. 1 and 5) wherein the transfer plate assembly 70 is adjacent the second or left end of the carriage 22. A pallet 74 is placed beneath the first position of the carriage 22 so that when the transfer plate assembly 70 is in the first position it is above the pallet 74. The transfer plate assembly 70 includes an upwardly facing surface 78 (FIG. 4) adapted to carry the articles or stacks of papers to be palletized, during movement of the transfer plate assembly 70 from the second or left position to the first or right position. The transfer plate assembly 70 also includes a downwardly facing surface 82.

Figure 3:
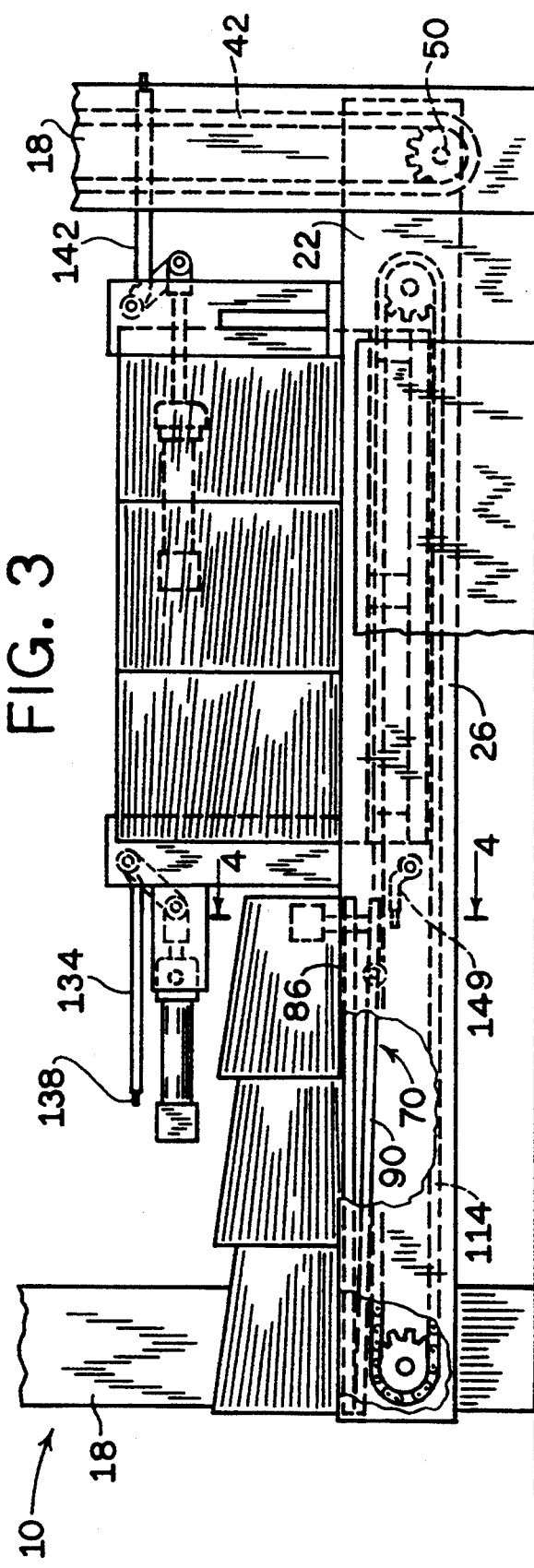
FIG. 3 is an enlarged, partial side view, partially cut away, of the palletizer.

In the preferred embodiment of the palletizer, the transfer plate assembly 70 is comprised of a stripper plate 86 including the upwardly facing surface 78, and a sensing plate 90 including the downwardly facing surface 82 of the transfer plate assembly 70. The sensing plate 90 is mounted beneath the stripper plate 86 for vertical movement relative to the stripper plate 86 from a first, or lower, position seen in FIG. 6, wherein the sensing plate 90 is spaced beneath the stripper plate 86, to a second, or higher, position seen in FIG. 7, wherein the sensing plate is positioned essentially against the bottom of the stripper plate. Preferably, the sensing plate 90 is pivotally connected to the stripper plate 86 at the left end (as viewed in FIG. 3) of the stripper plate 86, and is movably connected to the right end of the stripper plate 86. Preferably, the left end of the sensing plate 90 is pivotally connected to the left end of the stripper plate 86 by bolts threaded into stripper plate 86 and having lower ends extending through apertures in the sensing plate 90. Nuts and washers secure the lower ends of the bolts to the sensing plate 90 while allowing room for pivotal movement of the sensing plate 90.

In the illustrated construction, the right end of the stripper plate 86 includes a pair of apertures, and the right end of the sensing plate 90 has a pair of bolts 94 attached thereto and slidably extending through the apertures in the stripper plate 86. The lower end of each of the bolts 94 is secured to the sensing plate 90 by a pair of nuts 97. The heads of the bolts 94 restrict downward movement of the sensing plate 90 relative to the stripper plate 86, by abutting the top surface of stripper plate 86 adjacent the apertures.

The stripper plate 86 preferably has an upper surface having thereon a plurality of generally parallel, spaced apart, low-friction strips 98 extending in the direction of transfer plate assembly movement and wherein the upper surfaces combine to define the upwardly facing surface 78 of the transfer plate assembly 70, with the spaces between the strips 98 defining channels 102 in the upwardly facing surface 78. In the illustrated construction, the carriage 22 includes a pair of guide members 118 (FIG. 2) for assisting in positioning stacks of material on the stripper plate 86.

Strips 98 and accompanying channels 102 can be omitted from stripper plate so long as the thickness of the thinnest load unit to be handled is at least about 0.25 inch. Should thinner materials then need to be handled, a stripper plate 86 devoid of channels can readily be replaced with a stripper plate 86 having channels 102.

The downwardly facing surface 82 of sensing plate 90 has thereon a plurality of generally parallel, spaced-apart, low-friction strips 99 extending in the direction of transfer plate assembly movement and having lower surfaces combining to define the downwardly facing surface 82 of the transfer plate assembly 70, with the spaces between the strips 99 defining channels 106 in the downwardly facing surface 82.

Preferably the transfer plate assembly 70 is mounted on carriage 22 by a pair of wheels 110 rotatably mounted on one side of the stripper plate 86.and received in the upper channel 34 of the first carriage side member 26 for rolling movement along the lower surface of the channel 34, and a pair of wheels 110 rotatably mounted on the opposing side of the stripper plate 86 and received in the upper channel 34 of the second carriage side member 26 for rolling movement along the corresponding lower surface of its channel 34.

The palletizer 10 further comprises a drive assembly for horizontally moving the transfer plate assembly 70 between the first or right position and the second or left position. In the preferred embodiment, the drive assembly for moving the transfer plate assembly 70 includes, on each of the side members 26 of the carriage 22, an endless chain 114 extending through the upper and lower channels 34 and 38 and connecting to the transfer plate assembly 70. The endless chains 114 are connected to a common motive drive, such as a drive motor (not shown).

The palletizer 10 further comprises means for stopping downward movement of the carriage 22 relative to the supporting surface (such as the pallet, the previously deposited layer, or a spacing sheet). In the preferred embodiment, the means for stopping downward movement of the carriage 22 includes the sensing plate 90 and means for stopping downward movement of the carriage 22 when the sensing plate 90 moves upwardly from the first or lower position in response to contacting a supporting surface and transferring a predeterminable amount of weight to the underlying supporting surface. Preferably, and as best shown in FIG. 4, this means includes a proximity sensor 122 fixedly attached to the carriage 22, and a plate 126 attached to the head of one of the bolts 94 for triggering the proximity sensor 122 when the sensing plate 90 moves upwardly relative to the stripper plate 86.

When used with a compressible load such as newspapers, which form a load having an uneven top, the sensing plate 90 performs at least two functions. See e.g. the layer shown on the left in FIG. 3. First, the weight of the sensing plate compresses the underlying layer of material so that the underlying material layer is not greatly further compressed and pushed downwardly by the weight of the overlying material as the overlying material is transferred onto the underlying material. Second, as the underlying surface is compressed by the generally planar lower surface of the sensing plate, with allowance for channels 106 if present, any unevenness of the top surface, or any other discontinuity in the underlying layer, is evened out, such that a relatively uniform, and resiliently upwardly expandable, underlying layer is prepared, for transferring the overlying material onto the surface of the underlying layer.

Figure 6:
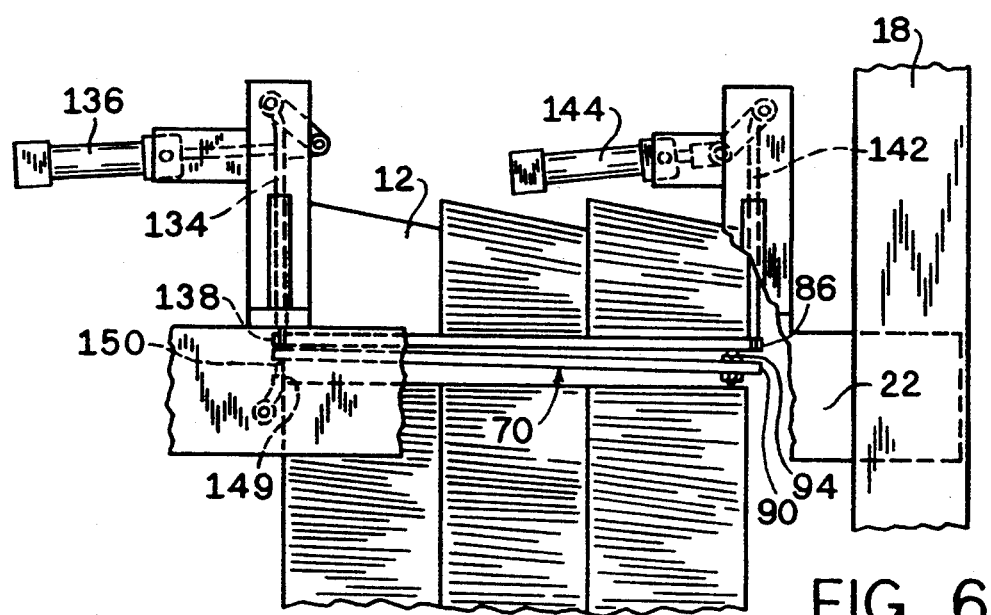

The palletizer 10 further comprises a first stripper for preventing the stacks of paper which are on stripper plate 86 as in FIG. 6 from moving with the stripper plate 86 as the transfer plate assembly 70 is withdrawn from the first position to the second position (from right to left as in FIG. 7), and a second stripper for preventing the underlying material from moving with the sensing plate 90 as the transfer plate assembly 70 is withdrawn. In the preferred embodiment, the first stripper includes projecting or combing fingers mounted on the carriage 22 and extending downwardly into the channels 102 in the upwardly facing surface 78 of the stripper plate 86 for preventing the stacks of papers from moving with the stripper plate 86 as the transfer plate assembly 70 is withdrawn.

In cases where the underlying layer is not especially compressible and its top surface is acceptably even for depositing another layer on it, then the use of sensing plate 90 is less important; as its functions of evening the top surface, and compressing the underlying load may be omitted. Thus, if desired, sensing plate 90 can be eliminated. If the sensing plate is eliminated, it is still important to retain some sensing apparatus such as proximity sensor 122 and to mount it appropriately, for sensing the proximity of the underlying layer.

Where the underlying layer need not be compressed, then the transfer plate assembly preferably stops close to the top of the underlying layer, but without necessarily touching it about the entire general top surface area. In that event, the withdrawal of the transfer plate assembly, to deposit its load onto the underlying pallet or load, causes little or no drag on the top layer on the load, and the second retainer, to retain the underlying layer, is usually not needed.

In the illustrated construction, the first stripper includes a first end plate 134 pivotally moveable between a raised position (see FIG. 3) wherein the first end plate 134 is parallel to the stripper plate 86, and a lowered position (see FIG. 6) wherein the first end plate 134 is perpendicular to the stripper plate 86. Power cylinder 136 moves the first end plate 134 between the raised and lowered positions.

Figure 9:
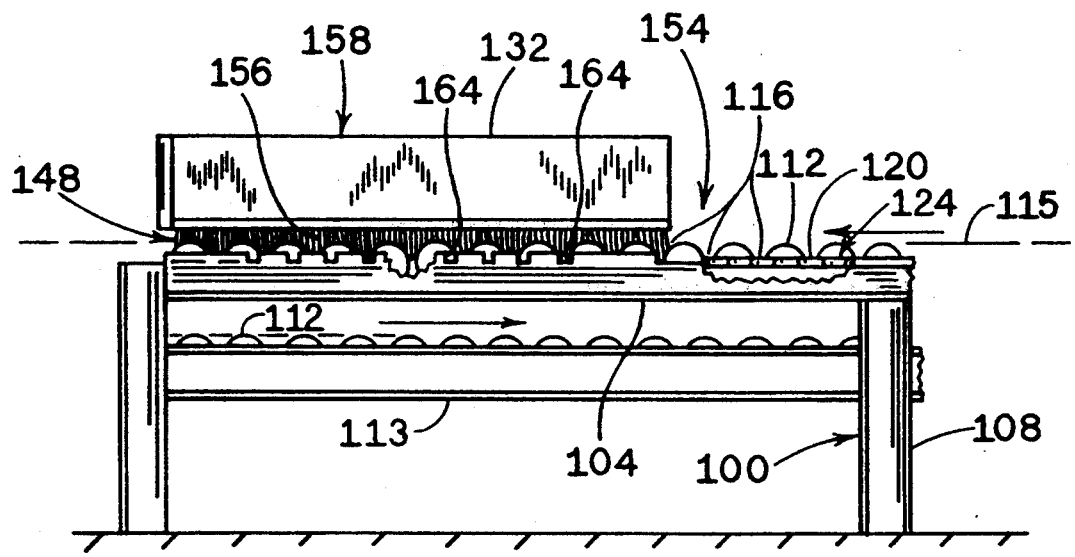
FIG. 9 is a cross-section taken at 9—9 of FIG. 2, and with the push arm traversed part way across the in-feed conveyor.
Figure 10:
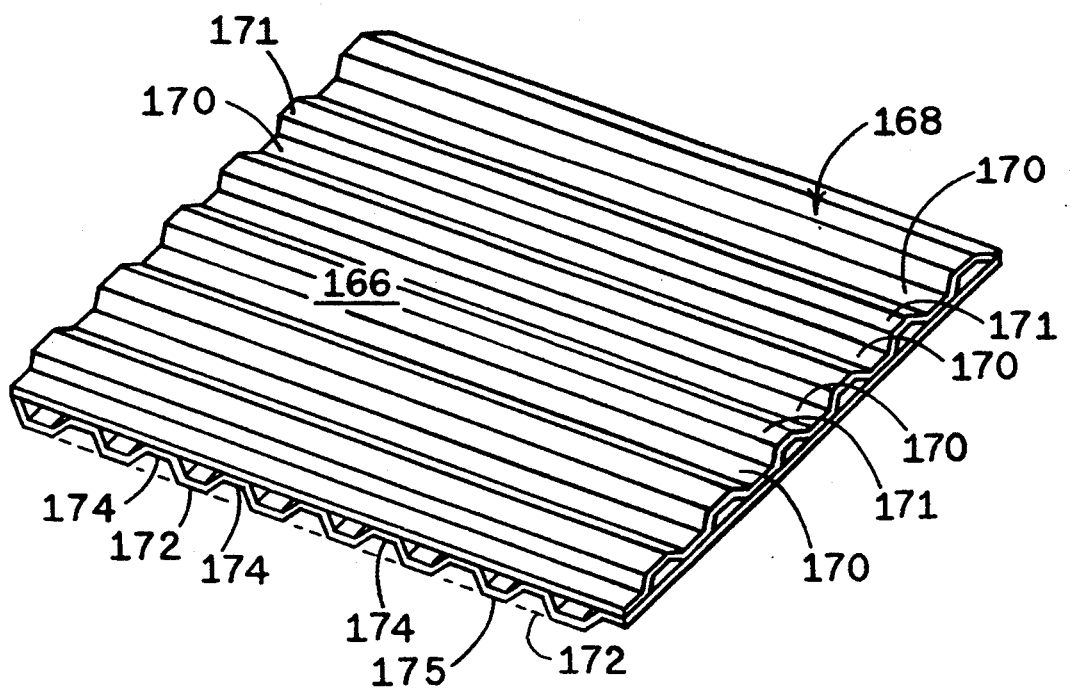
FIG. 10 is a pictorial view of a spacing sheet used in pallet loads made using the apparatus and methods of this invention.

First end plate 134 preferably includes a first set of fingers 138 which extend downwardly from its lower end into the stripper plate channels 102 when the first end plate 134 is in the lowered position. This is best seen in FIG. 9. First end plate 134 and first set of fingers 138 restrain the overlying stacks of papers as the stripper plate 86 is withdrawn.

Figure 5:
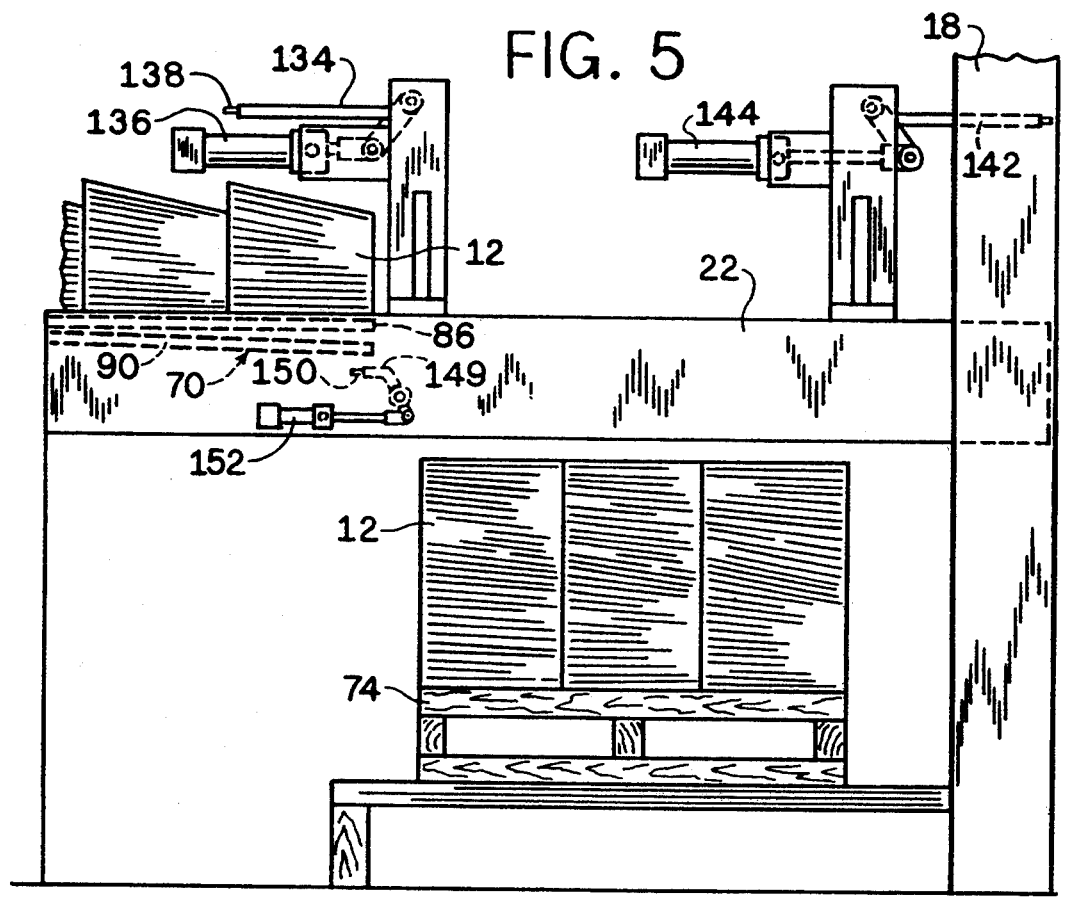
FIGS. 5-7 are enlarged, partial side views of the palletizer showing sequential operation thereof.

The carriage 22 includes a second end plate 142, similar to the first end plate 134, for restraining the layer of material when the stripper plate 86 is in the first or right position. Power cylinder 144 moves the second end plate 142 between its raised and lowered positions is shown in FIGS. 5 and 6.

The second or lower stripper preferably includes a second set of combing fingers mounted on the carriage 22 and extending upwardly into the channels 106 in the downwardly facing surface 82 of the sensing plate 90 for preventing a previously deposited stack of papers from moving with the sensing plate 90 as the transfer plate assembly 70 is withdrawn. Preferably, the second stripper includes a plate 149 and the second set of fingers 150 extending upwardly from plate 149. Plate 149 is mounted on a pivotally moveable horizontal shaft 151 so as to be pivotally moveable between a lowered position best shown in FIG. 5, and a raised position best shown in FIGS. 6, 7, and 8. Power cylinder 152 for moving the plate 149 and fingers 150 between the raised and lowered positions is shown in FIG. 5.

The transfer plate assembly 70 can be used to compress a previously deposited stack of material. In the illustrated embodiment, the sensing plate 90 causes some compression force on the previously deposited stack, as the previously deposited stack supports some of the weight of the sensing plate 90 in order to move the sensing plate 90 upwardly relative to stripper plate 86, and thus to stop downward movement of the carriage 22 through the functioning of proximity sensor 122. To the extent a delay is caused to occur between the time the sensing plate 90 moves upwardly to trigger the proximity sensor 122 and the time when the downward movement of carriage 22 is stopped, carriage 22 can continue to move downwardly causing previously deposited stack to also bear the weight of stripper plate 86.

Units of material 12 are fed to the palletizer 10 on in-feed conveyor 154 (FIGS. 1 and 2). In-feed conveyor 154 extends, adjacent the left end of the carriage 22 (FIG. 1), generally perpendicular to the direction of the back and forth movement of the transfer plate assembly 70. In the illustrated construction, in-feed conveyor 154 has a frame 100, including horizontal stringers 104, and vertical legs 108 supporting the stringers 104 from the floor. Conventional roller conveyor rollers 112 are arranged one behind the other along the length of in-feed conveyor 154, with their tops forming an imaginary plane 115 in which the units of material are supported on the conveyor.

Spaces 116 are between the rollers 112. The rollers are joined together at their opposing ends by chain links 120, forming chains 124, which travel along horizontal stringers 104, carrying the rollers 112, and then back under the horizontal stringers, along return trays 113, in an endless loop. The chains 124 are driven by a drive motor and corresponding sprockets, not shown.

The palletizer 10 includes an in-feed station 162 (FIG. 2) between the end of the in-feed conveyor 154 and the end of the frame 14 to permit an entire layer of units of material to be arranged before being pushed onto the stripper plate 86.

Push arm 158, shown in its rest, or default, position at the left side of in-feed conveyor 154 in FIG. 2, is mounted on ram 128 of power cylinder 130, for reciprocal movement across the in-feed conveyor 154 and in-feed station 162. Power cylinder 130 and corresponding ram 128 are shown in FIG. 1. Push arm 158 includes support member 132 extending generally horizontally from ram 128, along the length of the in-feed conveyor. A brush 148 extends downwardly from the support member 132. Bristles 156 are arrayed generally uniformly along the length of support member where it lies alongside the discharge locus 160 of in-feed conveyor 154. The ends of the bristles generally reach lower than the tops of the rollers. Accordingly, where the bristles are positioned over the rollers 112, the bristles are deflected, by the rollers, typically toward the spaces 116. Thus, a first subset of the bristles extends generally straight downwardly into the spaces while a second subset of the bristles is deflected by the rollers when the push arm is disposed over the rollers of the in-feed conveyor.

Bristles 156 can be made from a variety of materials, for example nylon polyamide. More importantly, the bristles must be sufficiently stiff, and arrayed in sufficient number along the push arm, that they can, in combination, push a unit of material from the in-feed conveyor, and onto the in-feed station, even if the unit is so thin that support member 132 does not engage it. The minimum-stiffness bristles acceptable for use in brush 148 can push a unit of material weighing at least 1 ounce per inch of dimension of the unit of material extending along the push arm. So long as the bristles are sufficiently deflectable to be deflected by the rollers, stiffer bristles are preferred. The greater the stiffness the greater the assurance that the bristles will reach beyond imaginary plane 115, below the tops of the rollers, and into the spaces 116, without being deflected by the units of material on the conveyor. Thus, the bristles are preferably sufficiently stiff that they can push more dense units of material, e.g. up to 1 pound or more per inch of dimension of the unit of material extending along the push arm.

Not all brushes, or bristle sets, are acceptable for use in this invention. Namely, a brush whose bristles are so easily deflected that they do not effectively push a unit of material weighing 1 ounce per inch of dimension along the push arm forms no part of this invention, and is thus not selected.

Conveyor 154 advances by advancing the chains 124, and rollers 112, on chains 124, along the length of stringers 104, and stopping whenever a row of units of material is arrayed along the discharge station of the in-feed conveyor. Conveyor 154 is not indexed as it stops. Rather, the conveyor stops upon receiving the signal to stop, without respect to location of the rollers along stringers 104. Thus, since the in-feed conveyor stops at random, the rollers stop at random, whereby the rollers 112 are positioned at an unpredicted set of locations along stringers 104 at each stop.

After advance of the rollers 112 stops, push arm 158 pushes the units of material across both the in-feed conveyor and the in-feed station 162 of the palletizer. As push arm 158 makes that traverse, the bristles reach not only into the spaces 116, but also into the channels 164 of the in-feed station 162 of the palletizer, thus engaging any thin-section material (e.g. a sheet of paper) on or near the imaginary plane 115, or in the spaces 116 between the rollers. With the random positioning of the rollers on conveyor 154, the channels 164 are, as shown in FIG. 9, usually not aligned with the spaces 116.

In some embodiments of the use of in-feed conveyor 154 with push arm 158, (including brush 148), chains 124 and rollers 112 continue their advance while push arm 158 traverses across in-feed conveyor 158 to push material onto in-feed station 162. In these embodiments, the chain/roller combination remains in continuous motion while push arm 158 advances successive groups of units of material 12 across the in-feed conveyor and onto in-feed station 162. In such case, a stop 117 is erected on conveyor 154 up stream of push arm 158 to prevent additional units of material from entering the discharge locus 160 while the push arm is traversing in-feed conveyor 154 and/or in-feed station 162.

Rollers 112 are only illustrative of carrying elements for carrying the units of material 12 on in-feed conveyor 154. Rollers 112 could, for example, be replaced by e.g. spaced metal bars riding on a tray extending across conveyor 154, between stringers 104.

In some embodiments of the process of the invention, the palletizer 10 is desirably used in combination with a spacing sheet such as that seen at 166 in FIG. 4. Spacing sheet 166 has an upper facing surface 168 similar to upwardly facing surface 78 of stripper plate 86, and has a plurality of generally parallel channels 170 and corresponding ridges 171 extending generally across the upper surface 168. A lower facing surface 172 is similar to downwardly facing surface 82 in transfer plate assembly 70 and has a plurality of channels 174 and corresponding ridges 175 extending generally across it. The upper and lower facing surfaces of spacing sheet 166 are generally defined at the extremities of those surfaces as they are farthest spaced from each other. Thus the upper and lower facing surfaces are physically discontinuous over the areas of channels 170 and 174, but are generally defined as the planes in which the physical ridges 171 and 175 reside.

The thickness of the spacing sheet between its top and bottom surfaces, whatever its construction, should be no more than about 1.0 inch, preferably less than 0.50 inch.

The lower surfaces of stacks 12 of sheet product have surface-to-surface contact with spacing sheet 166 at ridges 171 on its upper surface 168. Similarly, on those stacks overlain by a spacing sheet 166, the upper surface of the stacks have surface-to-surface contact with the corresponding sheet 166 at its ridges 175 on lower surface 172. The weight of the product overlying the respective spacing sheet applies a downwardly directed force between the product and the corresponding surfaces. To the extent that force is distributed evenly over the surface area of the product adjacent the spacing sheet, any deformation of the product by that force is minimized. For example, if ridges 171 were narrow, for example 1 cm. wide, and channels 170 were correspondingly wider, for example 4 cm. wide, then the product would tend to deform under the force of the weight, into channels 170.

With such deformation, the product would extend somewhat into channels 170. It is thus desirable that the surface portions of ridges 171 coincident with upper facing surface 168 constitute a significant portion of surface 168. Conversely especially the widths of channels 170 are preferably small. Thus the top of spacing sheet 166 can be characterized in that the ridges 171 should coincide with upper facing surface 168 over at least 15%, preferably at least 30%, and highly preferably at least 50% of the surface area of the spacing sheet, in combination with a maximum spacing between the portions of the ridges, which are in the upper surface (this corresponding generally with the widths of channels 170), of no more than 5 cm, preferably no more than 4 cm, highly preferably no more than 2.5 cm.

A similar relationship, of course, also exists with respect to the upwardly and downwardly surfaces of stripper plate 86, though to a lesser degree, since the maximum material load on stripper plate 86 is only one layer.

In some embodiments, channels 170 and 174 in the upper and lower surfaces respectively are preferably oriented perpendicular to each other in the spacing sheets 166, which are preferred for use in the method of the invention with compressible load materials. In other embodiments, they can be parallel.

The palletizer 10 operates generally as follows, with compressible load materials. A pallet 74 is placed beneath the right end of the frame 14 as shown in FIG. 1. A spacing sheet 166 is placed on the pallet 74. Individual units of material 12 are fed along in-feed conveyor 154, until the correct number of units of material 12 has been received at the conveyor discharge locus 160, to make a row in the layer being formed, whereby the conveyor discharge locus 260 operates as a row forming station. When an entire row, of units has thus been received at the row forming station of the in-feed conveyor 154 (across the width of in-feed station 162), push arm 158 advances transversely across conveyor 154. As push arm 158 advances across conveyor 154, some of the bristles 156 reach downwardly into spaces 116, while others of the bristles are deflected by the rollers 112, and generally brush the surfaces of the rollers as they traverse across the conveyor. As the bristles reach into the spaces 116, and ride on the rollers 112, they engage any thin-section materials at or near the imaginary plane 115 defined by the tops of the rollers, pushing the thin-section, as well as thicker section, units of material off the conveyor and onto the in-feed station 162 of the palletizer.

This process continues until an entire layer of units of material has been accumulated at the in-feed station 162. Then, with the transfer plate assembly 70 in the left position, or adjacent the staging area 162, and with the carriage 22 at a height such that the stripper plate 86 is generally level with the staging area 162, the push arm 158 pushes the entire layer of units of material onto the stripper plate 86.

The carriage 22 then moves to a height above the supporting surface (either the spacing sheet, or a previously deposited layer of stacks of papers), as shown in FIG. 5 and the transfer plate assembly 70 moves to the right, such that it is positioned above the pallet, as shown in FIG. 6.

The carriage 22 is lowered, with essentially full surface contact between the top of the underlying partial load and downwardly facing surface 82 of sensing plate 90. The lowering of carriage 22 is stopped by upward movement of the sensing plate 90 as described previously.

Figure 7:
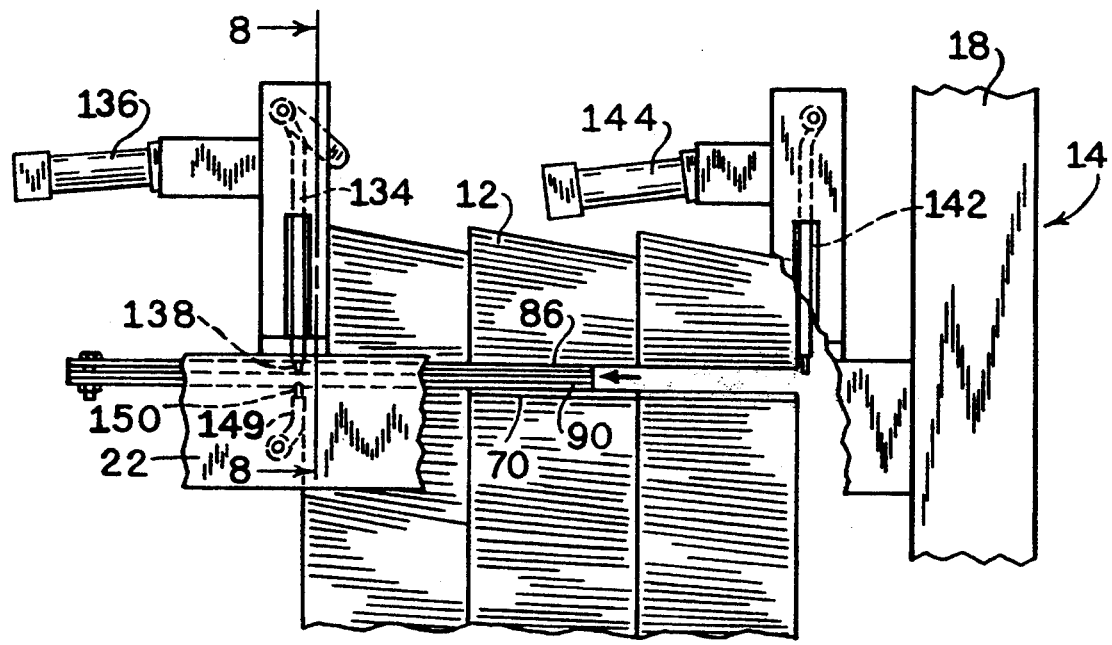
Figure 8:
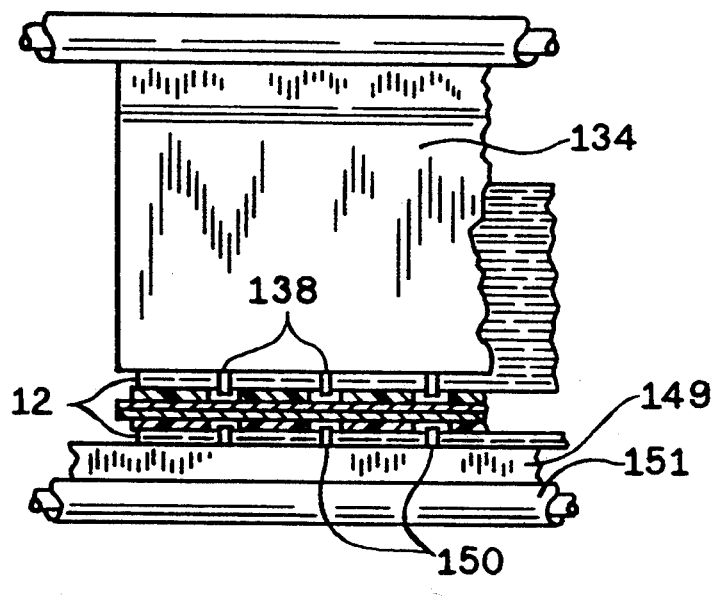
FIG. 8 is a cross-sectional view taken along line 8—8 in FIG. 7.

With the end plates 134 and 142 lowered, with fingers 150 in the raised position, and with the underlying layer under compression, transfer plate assembly 70 is withdrawn from the right to the left, as shown in FIG. 7. As transfer plate assembly 70 moves to the left, the friction between the upwardly and downwardly facing surfaces 78 and 82, and the corresponding overlying material and the underlying support, tends to drag those respective members of the load material which are located adjacent the transfer plate assembly 70.

With end plate 134 lowered, the fingers 138 project into channels 102, and the combination of plate 134 and fingers 138 prevents the stack of papers on the stripper plate 86 from moving with the stripper plate 86. The plate 149 and fingers 150 prevent the supporting surface on the underlying layer from being dragged along with the sensing plate 90 by the friction between sensing plate 90 and the supporting surface. See FIG. 8. When the transfer plate assembly 70 reaches the left position, the end plates 134 and 142 are returned to the raised position, the plate 149 and fingers 150 are returned to the lowered position, and the carriage 22 is returned to the position in which the stripper plate 86 is level with the in-feed station 162. The above steps are repeated until the pallet is as full as desired.

When the desired quantity of material has been loaded onto the pallet, with the material being underlain by a spacing sheet 166, the loaded pallet is discharged from the palletizer.

The invention revolves about use of the brush 148 on push arm 158, to assuredly remove thin-section materials from in-feed conveyor 158, and move them across in-feed station 162, without the requirement of indexing the spaces 116 between rollers 112 with channels 164 on the in-feed station; and without the requirement of indexing either spaces 116 or channels 164 with any particular projecting fingers or bristles on push arm 158. Brush 148 has many bristles which are suitable for both the operation of sweeping the spaces and sweeping the surfaces of the rollers.

Those skilled in the art will now see that certain modifications can be made to the apparatus and methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

Having thus described the invention, what is claimed is:

1. A material handling system comprising a palletizer, said palletizer comprising an in-feed station for receiving units of material; transfer apparatus for transferring units of material from said in-feed station; and a push arm for pushing units of material onto said in-feed station by moving in a first direction toward and over said in-feed station, said push arm including a support member extending transverse to the direction of movement of said push arm, said push arm further including a brush including a set of resiliently deflectable bristles extending from said support member such that said bristles impinge on, and are deflected by, said in-feed station when said support member is disposed over said in-feed station.

2. A material handling system as in claim 1 wherein said bristles are sufficiently stiff, and in sufficient number, that said bristles can, in combination, push onto said in-feed station a unit of material weighing up to at least 1 ounce per inch of dimension of the unit of material extending along said support member.

3. A material handling system as in claim 1 wherein said bristles are sufficiently stiff, and in sufficient number, that said bristles can, in combination, push onto said in-feed station a unit of material weighing up to at least 2 ounces per inch of dimension of the unit of material extending along said support member.

4. A material handling system as in claim 1 wherein said bristles are sufficiently stiff, and in sufficient number, that said bristles can, in combination, push onto said in-feed station a unit of material weighing up to at least 8 ounces per inch of dimension of the unit of material extending along said support member.

5. A material handling system as in claim 1 wherein said bristles are sufficiently stiff, and in sufficient number, that said bristles can, in combination, push onto said in-feed station a unit of material weighing up to at least 1 pound per inch of dimension of the unit of material extending along said support member.

6. A material handling system as in claim 1 wherein said in-feed station comprises a stationary plate, for forming a layer thereon.

7. A material handling system as in claim 1 wherein said in-feed station comprises a transfer plate for forming a layer thereon and transferring the layer out of said in-feed station.

8. A material handling system as in claim 1, and including an in-feed conveyor disposed adjacent said in-feed station of said palletizer such that units of material can be pushed from said in-feed conveyor directly onto said in-feed station of said palletizer, said in-feed conveyor including (i) a frame, (ii) a material carrier supported on said frame and having carrying elements for carrying units of material, said carrying elements having top surfaces for interfacing with the units of material, and being arranged one behind the other, with spaces between said carrying elements and extending transversely across said in-feed conveyor, said push arm being mounted and positioned to traverse across said in-feed conveyor and thereby to push units of material off said in-feed conveyor and onto said in-feed station, and wherein, as said push arm traverses across said in-feed conveyor, a first subset of said bristles are deflected by said carrying elements, and a second subset of said bristles extend into said spaces with less deflection than said first subset.

9. A material handling system as in claim 2, and including an in-feed conveyor disposed adjacent said in-feed station of said palletizer such that units of material can be pushed from said in-feed conveyor directly onto said in-feed station of said palletizer, said in-feed conveyor including (i) a frame, (ii) a material carrier supported on said frame and having carrying elements for carrying units of material, said carrying elements having top surfaces for interfacing with the units of material, and being arranged one behind the other, with spaces therebetween, said push arm being mounted and positioned to traverse across said in-feed conveyor and thereby to push units of material off said in-feed conveyor and onto said in-feed station, and wherein, as said push arm traverses across said in-feed conveyor, a first subset of said bristles are deflected by said carrying elements, and a second subset of said bristles extend into said spaces with less deflection than said first subset.

10. A material handling system as in claim 3, and including an in-feed conveyor disposed adjacent said in-feed station of said palletizer such that units of material can be pushed from said in-feed conveyor directly onto said in-feed station of said palletizer, said in-feed conveyor including (i) a frame, (ii) a material carrier supported on said frame and having carrying elements for carrying units of material, said carrying elements having top surfaces for interfacing with the units of material, and being arranged one behind the other, with spaces therebetween, said push arm being mounted and positioned to traverse across said in-feed conveyor and thereby to push units of material off said in-feed conveyor and onto said in-feed station, and wherein, when said push arm traverses across said in-feed conveyor, a first subset of said bristles are deflected by said carrying elements, and a second subset of said bristles extend into said spaces with less deflection than said first subset.

11. A material handling system as in claim 8, said in-feed conveyor having a discharge locus, and comprising drive apparatus for driving said carrying elements and thereby moving said carrying elements toward said discharge locus.

12. A method of removing units of material from a conveyor wherein the conveyor has a length, a width transverse to said length, and opposing sides, and comprises a frame; a material carrier supported on the frame and having carrying elements arranged one behind the other, the carrying elements having top surfaces which, in combination, define an imaginary plane in which units of material are supported on said conveyor, and spaces between the carrying elements and extending transversely across the conveyor, said method comprising the steps of:
  (a) positioning a push arm, comprising a support member, along the length of said conveyor, at one said side thereof, said push arm further comprising a brush, including a set of resiliently deflectable bristles extending from said support member such that at least some of said bristles extend below said imaginary plane;
  (b) traversing said push arm in a path across the width of said conveyor to thereby push off any unit of material on said conveyor encountered by said bristles along the path traversed by said push arm, whereby in traversing across said conveyor, at least some of said bristles on said push arm extend below said imaginary plane and into said spaces to sweep off said conveyor any thin-section units of material disposed proximate said imaginary plane.

13. A method as in claim 12 wherein said conveyor has a discharge locus and said push arm is positioned over said conveyor at said discharge locus, and including, prior to said traversing of said push arm across the width of said conveyor, the steps of:
  (c) advancing said carrying elements along the length of said conveyor and toward said discharge locus, to thereby advance units of material toward said discharge locus; and
  (d) stopping the advance of said carrying elements such that said carrying elements are positioned randomly along the length of said conveyor and with respect to said push arm.

14. A method as in claim 12 wherein said conveyor has a discharge locus and said push arm is positioned over said conveyor at said discharge locus, and including the steps of:
  (c) advancing said carrying elements, and corresponding ones of the spaces a first time along the length of said conveyor;
  (d) stopping the advance of said carrying elements, and the corresponding ones of the spaces, a first time, such that the corresponding ones of said spaces are positioned at a first set of loci along the length of said conveyor;
  (e) traversing said push arm across the width of said conveyor, with a first subset of said bristles being deflected by said carrying elements, and a second subset of said bristles extending into said spaces with less deflection than said first subset;
  (f) advancing said carrying elements and the corresponding ones of the spaces a second time along the length of said conveyor;
  (g) stopping the advance of said carrying elements, and the corresponding ones of the spaces, a second time, such that the corresponding ones of the spaces are positioned at different loci along the length of said conveyor; and
  (h) traversing said push arm across the width of said conveyor, with a third subset of said bristles, different from, but not necessarily exclusive of, said first subset, being deflected by said carrying elements, and a fourth subset of said bristles, different from, but not necessarily exclusive of, said second subset, extending into said spaces with less deflection than said third subset.

15. A method as in claim 14 wherein steps (c)–(h) are performed in the order stated.

16. A method as in claim 12 and including the steps of:
  (c) advancing said carrying elements along the length of said conveyor; and
  (d) continuing the advance of said carrying elements while traversing said push arm across the width of said conveyor.

17. A material handling system comprising a palletizer, said palletizer comprising a row forming station for receiving units of material and forming the units of material into rows; a layer forming station for forming the rows of units of material into a layer; and a push arm for pushing formed rows of units of material from said row forming station onto said layer forming station by moving in a first direction toward and over said row forming station, said push arm including a support member extending transverse to the direction of movement of said push arm, said push arm further including a brush including a set of resiliently deflectable bristles extending from said support member such that said bristles impinge on, and are deflected by, said row forming station when said support member is disposed over said row forming station.

18. A material handling system as in claim 17 wherein said bristles are sufficiently stiff, and in sufficient number, that said bristles can, in combination, push onto said layer forming station a unit of material weighing up to at least 1 ounce per inch of dimension of the unit of material extending along said support member.

19. A material handling system as in claim 17 wherein said bristles are sufficiently stiff, and in sufficient number, that said bristles can, in combination, push onto said layer forming station a unit of material weighing up to at least 2 ounces per inch of dimension of the unit of material extending along said support member.

20. A material handling system as in claim 17 wherein said bristles are sufficiently stiff, and in sufficient number, that said bristles can, in combination, push onto said layer forming station a unit of material weighing up to at least 1 pound per inch of dimension of the unit of material extending along said support member.

21. A material handling system as in claim 17, said material handling system further comprising an infeed conveyor, said infeed conveyor comprising said row forming station, a frame, and a material carrier supported on said frame and having carrying elements for carrying units of material, said carrying elements having top surfaces for interfacing with the units of material, and being arranged one behind the other, with spaces between said carrying elements and extending transversely across said in-feed conveyor, said push arm being mounted and positioned to traverse across said in-feed conveyor at said row forming station and thereby to push units of material off said row forming station and onto said layer forming station, and wherein, as said push arm traverses across said in-feed conveyor, a first subset of said bristles are deflected by said carrying elements, and a second subset of said bristles extend into said spaces with less deflection than said first subset.

22. A material handling system as in claim 21, said in-feed conveyor having a discharge locus, and comprising drive apparatus for driving said carrying elements and thereby moving said carrying elements toward said discharge locus.

* * * * *